United States Patent [19]
Pirl et al.

[11] Patent Number: 5,182,429
[45] Date of Patent: Jan. 26, 1993

[54] SYSTEM AND METHOD FOR LASER WELDING THE INNER SURFACE OF A TUBE

[75] Inventors: William E. Pirl, Levelgreen; Edward H. Smith, Brave; Charles H. Roth, Jr., N. Huntingdon; Rodney A. Lutz, Penn Township, Westmoreland County; John J. Anderson, Gibsonia, all of Pa.

[73] Assignee: Westinghouse Electric Corp., Pittsburgh, Pa.

[21] Appl. No.: 705,050

[22] Filed: May 23, 1991

[51] Int. Cl.$^5$ ............................................. B23K 26/00
[52] U.S. Cl. ......................... 219/121.63; 219/121.78; 376/260
[58] Field of Search .................. 219/121.63, 121.64, 219/121.82, 121.78, 121.83; 376/260

[56] References Cited

U.S. PATENT DOCUMENTS

| | | | |
|---|---|---|---|
| 4,500,764 | 2/1985 | Girodi et al. | 219/59.1 |
| 4,510,372 | 4/1985 | Kobuck et al. | 219/125.11 |
| 4,629,853 | 12/1986 | Yttergren et al. | 219/124.03 X |
| 4,694,136 | 9/1987 | Kasner et al. | 219/121.64 |
| 4,694,137 | 9/1987 | Hawkins et al. | 219/121.63 |
| 4,724,298 | 2/1988 | Hawkins et al. | 219/121.78 |
| 4,827,098 | 5/1989 | Kasner et al. | 219/121.63 |
| 4,839,495 | 6/1989 | Kitera et al. | 219/121.63 |
| 4,855,564 | 8/1989 | Hawkins et al. | 219/121.78 |
| 4,978,834 | 12/1990 | Griffaton | 219/121.63 |
| 4,983,786 | 1/1991 | Griffaton | 219/121.63 |
| 5,006,268 | 4/1991 | Griffaton | 219/121.63 |

FOREIGN PATENT DOCUMENTS

| | | |
|---|---|---|
| 54-34978 | 9/1973 | Japan . |
| 54-16293 | 1/1976 | Japan . |
| 58-48464 | 5/1978 | Japan . |
| 54-20742 | 7/1979 | Japan . |
| 57-40072 | 7/1980 | Japan . |
| 57-40074 | 7/1980 | Japan . |
| 6334111 | 5/1982 | Japan . |
| 58-162472 | 9/1983 | Japan . |
| 59-26872 | 2/1984 | Japan . |
| 6364383 | 5/1984 | Japan . |
| 59-138579 | 8/1984 | Japan . |
| 1-275381 | 11/1989 | Japan . |
| 1-275382 | 11/1989 | Japan . |

Primary Examiner—C. L. Albritton

[57] ABSTRACT

Both a system and method are provided for laser welding the inner walls of conduits, such as the sleeves used to repair the heat exchanger tubes of nuclear steam generators. The system generally comprises an elongated tubular housing, a fiber-optic cable for conducting remotely generated laser light into the tubular housing, a beam deflection mechanism supported within the distal end of the tubular housing and including a rotating mirror for radially reflecting and focusing light received from the fiber-optic cable around the inner wall of the sleeve, and a tracking assembly mounted on the distal end of the tubular housing for maintaining a constant radial distance between the mirror of the beam deflection mechanism and the inner wall of the sleeve despite any irregularities which may be present in the roundness of the sleeve. The tracking assembly includes at least one roller which is resiliently mounted in the tubular housing of the system behind the front portion of the mirror of the beam deflection mechanism. To facilitate mirror replacement, the distal end of the tubular housing is easily removable. To ensure reliable rotation of movement, an electric motor and gear train is mounted in the proximal end of the tubular housing. Finally, the fiber-optic cable that extends through the proximal end of the tubular housing is configured to traverse the electric motor and drive train with a single S bend in order to maintain a high light transmission efficiency through the cable.

25 Claims, 5 Drawing Sheets

SYSTEM AND METHOD FOR LASER WELDING THE INNER SURFACE OF A TUBE

BACKGROUND OF THE INVENTION

This invention generally relates to welding systems, and is specifically concerned with a system and method for laser welding a sleeve to the inner surface of a heat exchanger tube in order to repair the tube.

Systems for laser welding sleeves to the inner surfaces of heat exchanger tubes are known in the prior art. Such systems are particularly useful in maintaining the integrity of the heat exchanger tubes used in nuclear steam generators. However, before either the utility or the limitations of such systems can be appreciated, some general background as to the structure, operation and maintenance of nuclear steam generators is necessary.

Nuclear steam generators are generally comprised of a bowl-shaped primary side, a tubesheet disposed over the top of the primary side, and a cylindrically shaped secondary side which in turn is disposed over the tubesheet. Hot, radioactive water from the reactor core circulates through the primary side of the steam generator, while non-radioactive water is introduced into the secondary side. The tubesheet hydraulically isolates but thermally connects the primary side to the secondary side by means of a number of U-shaped heat exchanger tubes whose bottom ends are mounted in the tubesheet. Hot, radioactive water from the primary side flows through the interior of these heat exchanger tubes while the exterior of these tubes comes into contact with the non-radioactive water in the secondary side in order to generate non-radioactive steam.

In the secondary side of such steam generators, the legs of the U-shaped heat exchanger tubes extend through bores present in a plurality of horizontally-oriented support plates that are vertically spaced from one another, while the ends of these tubes are mounted within bores located in the tubesheet. Small, annular spaces are present between these heat exchanger tubes and the bores in the support plates and the tubesheet which are known in the art as "crevice regions". Such crevice regions provide only a very limited flow path for the feed water that circulates throughout the secondary side of the steam generator, which may cause "dry boiling" to occur wherein the feed water boils so rapidly that these regions can actually dry out for brief periods of time before they are again immersed by the surrounding feed water. This chronic drying-out may cause impurities in the water to precipitate and collect in these crevice regions. These precipitates can ultimately create sludge and other debris that may promote the occurrence of stress corrosion cracking in the regions of the tubes surrounded by the bores of the tubesheet and the support plates which, if not repaired, will ultimately allow radioactive water from the primary side to contaminate the non-radioactive water in the secondary side of the generator.

To prevent such contamination from occurring, a repair procedure known as "sleeving" has been developed wherein a tubular sleeve formed from the same stainless steel as the damaged heat exchanger tube is slid up within the tube so that it traverses the corroded or otherwise damaged length of the tube. The ends of the sleeve are then affixed to the inner surfaces of the tubes in order to form a hydraulic "bridge" across the corroded or otherwise degraded length of the tube.

In the past, the ends of such sleeves have been affixed around the inner diameters of the heat exchanger tubes by mechanical expansions, brazing, and laser welding by means of a thin circle of laser light. While all three of these techniques have proven themselves to be effective in the field, laser welding is now thought to be the overall best technique for a variety of reasons. First, a properly-executed weld joint between the outer diameter of a sleeve and the inner diameter of a tube results in the strongest and most leak-proof connection between the tube and the sleeve. Secondly, such welding over only a thin circle around the inner diameter of the sleeve may cause the least amount of adverse metallurgical changes to occur in the Inconel ® forming the tube and the sleeve. By contrast, mechanical expansions require a significant portion of both the tube and the sleeve to be radially and inelastically deformed, thereby work-hardening the metal. Brazing necessitates the application of a large amount of heat over a large length of the sleeve and tube, which may result in adverse changes in the grain structure of the metal in these regions that renders the metal more susceptible to stress corrosion cracking. Brazing may also cause thermal stresses to occur in the tubes as a result of thermal expansion. While there are procedures which satisfactorily relieve such thermally-induced stresses, the use of such stress-relief procedures protracts the time necessary to install the sleeves which is undesirable, since for many utilities the revenue losses associated with any repair procedure exceed over a million dollars per day.

Laser welding is typically implemented by a welding system comprising an elongated weld head that is insertable within a sleeve and that is concentrically disposed around the inner walls of a tube to be repaired. Laser light is typically transmitted to the weld head through a fiber optic cable. The weld head may include a prism or mirror for radially directing a focused laser beam onto the inner wall of the sleeve, and the system may include means for rotating the mirror or prism of the weld head around the inner diameter of the sleeve to trace a circular path around the sleeve. An example of such a laser welding system is disclosed in U.S. Pat. No. 4,839,495. Because laser welding techniques are capable of reliably creating a weld joint by the application of a radially-directed beam of laser light along a very thin circle around the inner diameter of the sleeve, adverse changes in the metals forming the sleeve in the tube are minimized to very small localities in the tube. Moreover, the highly localized nature of the heat used to weld the sleeve to the tube minimizes thermal differential expansion, thereby obviating the need for time consuming stress-relief techniques. These advantages, in combination with the strength, durability, and leak-proof seal that such welding provides, makes laser welding the most desirable choice for affixing a sleeve to the inner surfaces of damaged heat exchanger tubes.

Unfortunately, none of the prior art laser welding systems that the applicant is aware of is capable of effectively and reliably welding the inner wall of a sleeve or a tube that is significantly out-of-round. While prior art systems are known which include spring-loaded centering devices that keep the rotating housing of the weld head aligned with the center line of the tube or sleeve, the applicant has noted that the radially-directed laser beam may well be thrown out of focus as the beam sweeps around the tube or sleeve due to the varying distances between the mirror or prism that radially directs the laser beam, and the tube or sleeve wall. The resulting out-of-focus laser beam is not as capable of reliably welding a tube or sleeve as a beam that stays in constant sharp focus.

Still another problem that the applicants have observed in prior art systems stems from the use of two or more S-shaped bends in the distal end of the fiber-optic cable disposed in the tubular housing of the weld head. Such bending of the cable is sometimes necessitated by the presence of large components in the proximal ends of the housing, such as the electric motors and drive train used to rotate the mirrors or prisms which radially steer the laser beam around the inner wall of the tube or sleeve. However, the applicant has noted that when such fiber-optic cables traverse such large components by the use of two S bends, the resulting transmissivity of the cable is seriously impaired. This problem may be remedied by lengthening the housing so as to provide a greater distance between the S bend above the electric motor or other component, and the S bend below the motor. However, the long length of the weld head housing which results from such a solution makes it difficult, if not impossible, to insert and withdraw the weld head into heat exchanger tubes arranged around the periphery of the tubesheet due to the proximity of these tubes to the inwardly curving walls of the primary side of the generator.

Still another shortcoming associated with the prior art has been the difficulty, if not the impossibility, of replacing the mirror or prism which radially deflects and steers the laser beam around the inner wall of the tube or sleeve. Despite the provision of a constant stream of inert gas through the welding housing during the welding operation, the resulting fusion and vaporization of metal ultimately fouls the mirror or prism to an extent which renders it useless. The inability to easily replace such a fouled mirror necessitates replacement of the entire weld head, which is a time consuming and expensive operation. Additionally, such weld head replacement slows down the entire maintenance operation, and necessitates that more than one intact welding head be kept on hand at all times during a maintenance operation.

Clearly, what is needed is a laser welding system that is capable of accurately and reliably welding sleeves or tubes which may be slightly out-of-round. Preferably, the housing of such a welding system would be short enough so peripheral tubes could be easily serviced. Finally, it would be desirable if the mirror or prism used in the beam deflecting mechanism could be easily and expeditiously replaced in the field without the need for maintaining more than one complete welding head on hand at all times.

SUMMARY OF THE INVENTION

The invention is both a system and method for laser welding the inner wall of a conduit, such as a sleeve used to repair a heat exchanger tube in a nuclear steam generator, which avoids or at least ameliorates the shortcomings associated with the prior art. The system generally comprises an elongated tubular housing having a distal portion and a proximal portion, a fiber-optic cable for conducting remotely generated laser light into the tubular housing, a beam deflection mechanism supported within the housing and including a rotating reflector for radially directing and focusing laser light received from the fiber-optic cable toward the inner wall of the sleeve, and a tracking assembly mounted on the tubular housing for maintaining a constant radial distance between the reflector of the beam deflection mechanism and the inner wall of the sleeve despite irregularities in the roundness of the sleeve in order to maintain a sharp focus of the laser beam against the sleeve wall. To this end, the tracking assembly includes a biasing means in the form of at least one and preferably two spring-loaded rollers for applying a net biasing force against the back portion of the reflector so as to maintain the front portion of the reflector a constant radial distance from the sleeve wall. Additionally, in order to provide substantially frictionless engagement between the tubular housing containing the reflector and the inner sleeve wall, the tracking assembly further includes a non-resilient roller mounted in the housing adjacent to the front portion of the reflector. The combination of two resilient rollers located at the back of the reflector, and a non-resilient roller located in the housing adjacent to the front portion of the reflector provides a positive, three point contact between the tracking assembly and the inner wall of the sleeve.

In the preferred embodiment, an electric motor is provided within the proximal portion of the tubular housing in order to rotate the distal portion of the housing. The output shaft of the motor is connected to a drive train which terminates in a drive gear. The drive gear in turn engages a driven gear located around the inner diameter of the proximal end of the housing.

The optical configuration of the beam deflection mechanism requires that the distal end of the fiber-optic cable be aligned with the center line of the housing. However, the provision of the electric motor in the proximal portion of the housing necessarily displaces the orientation of the fiber-optic cable within the proximal portion of the housing to the side of the housing. The fiber-optical cable is deliberately configured to longitudinally traverse the obstructing electric motor in the proximal portion of the housing by means of a single S bend only. Applicant has empirically found that such a cable configuration efficiently transmit the laser light through the fiber-optic cable without the need for extending the longitudinal dimensions of the housing to an extent to where interference occurs between the housing and the concave walls of the primary side of the generator located adjacent to the peripheral heat exchanger tubes. Applicant has further empirically and surprisingly determined that the maximum allowable radius of curvature that such an S bend can tolerate before light transmissivity significantly declines is a little over twice the critical radius that the fiber-optic cable is rated at by the manufacturer.

As has been previously indicated, the distal portion of the housing is rotatable relative to the proximal portion thereof. In order to facilitate the replacement of the reflector within the distal portion of the housing, the distal end of the housing is removable from the balance of the proximal portion of the housing by the removal of a single screw.

The beam deflection mechanism includes two lenses for focusing the laser light from the fiber-optic cable, and a sleeve for supporting the lenses which is mounted onto the proximal portion of the tubular housings so that the lenses do not rotate along with the reflecting means. The provision of such non-rotating focusing lenses affords a greater degree of optical stability to the laser beam being radially directed toward the sleeve wall. Moreover, the longitudinal positions of the focusing lenses within the sleeve are adjustable, which advantageously lends a greater degree of optical versatility to the beam deflection mechanism. Specifically, if it ever becomes desirable to change the radial distance between the front portion of the reflector and the sleeve wall by adjusting the position of the front roller of the tracking assembly, the laser beam can be refocused into a sharp, thin line by moving one or both of the lenses along the longitudinal axis of the lens support sleeve.

In the method of the invention, a laser welder comprising an elongated tubular housing connected to a fiber-optic cable and including a beam deflection mechanism is inserted into the open end of the tube or sleeve to be welded. Laser light is then transmitted through the fiber-optic cable, and the reflector of the beam deflection mechanism is rotated in order to radially direct a thin, high intensity laser beam around the inner wall of the tube or sleeve in a circular path. All during the welding operation, a constant, radially directed biasing force is applied against the back portion of the reflector so that the tubular housing surrounding the front portion of the reflector constantly slidably engages the inner wall of the tube or sleeve in order to maintain a constant distance between the front portion of the reflector, and the inner wall of the sleeve or tube.

The system and the method of the invention reliably and expeditiously provides a circular weld joint between a sleeve and a heat exchanger tube through a weld head housing which is short enough to easily service even the peripherally-located heat exchanger tubes in a nuclear steam generator. Moreover, the easy removability of the distal end of the housing surrounding the reflector allows the mirror or prism to be rapidly and conveniently replaced in the field.

DETAILED DESCRIPTION OF THE INVENTION

Figure 1:
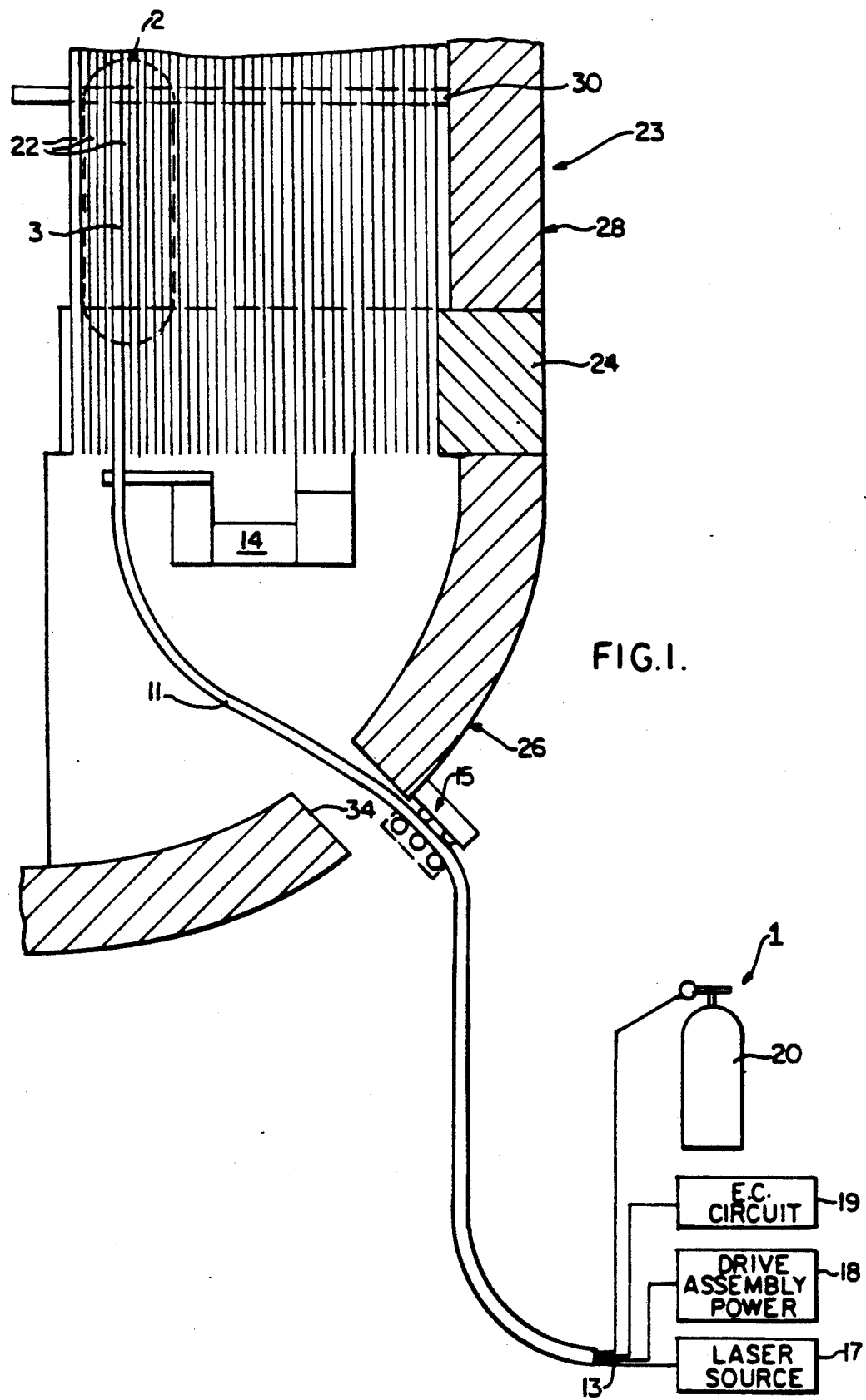
FIG. 1 is a partial, cross-sectional side view of a nuclear steam generator, illustrating how all of the major components of the welding system of the invention would appear when installed in the generator.
Figure 2:
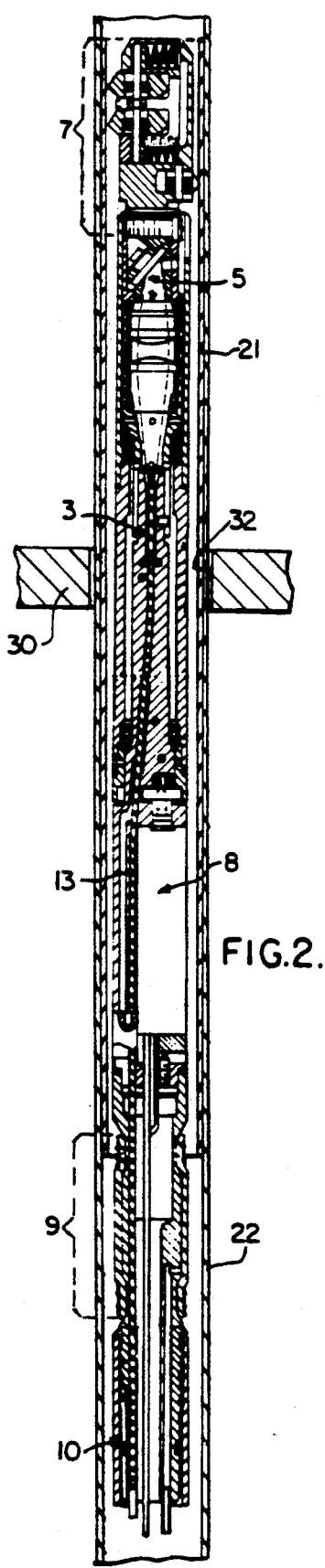
FIG. 2 is an enlargement of the area circled in FIG. 1, illustrating the housing of the welding system disposed within a reinforcing sleeve in a heat exchanger tube in a nuclear steam generator.

With reference now to FIGS. 1 and 2, wherein like numerals designate like components throughout all of the several figures, the welding system 1 of the invention generally comprises an elongated tubular welding housing 3 having a beam deflection assembly 5 rotatably connected to its distal end. As will be seen shortly, the beam deflection assembly 5 has a front portion 6 which includes a mirror canted at a 40 degree angle with respect to the longitudinal axis of the housing 3 for directing a concentrated beam of laser light around the inner diameter of a tube or sleeve in a substantially radial direction. The small, non-radial angular component of the beam orientation helps to eliminate metal splatter on the mirror. A tracking assembly 7 is disposed at the top end of the housing just above the beam deflection mechanism 5 for maintaining the distance between the front portion 6 of the beam deflection mechanism 5 and the inner diameter of a tube or sleeve at a constant value as the beam deflection mechanism 5 rotates within the tube or sleeve. Immediately below the beam deflection mechanism 5 the housing 3 contains a drive assembly 8 for selectively rotating the beam deflection mechanism 5 with respect to the balance of the housing 3. Near the proximal end of the housing, a securing assembly 9 is provided for selectively securing and centering the housing at a desired position along the longitudinal axis of the sleeve or tube to be welded. An eddy current probe 10 is disposed immediately beneath the securing assembly 9 to assist in the proper positioning of the welder housing 3 within a selected tube or sleeve. A length of flexible tubing 11 is connected onto the proximal end of the welder housing 3 for housing a fiber-optic cable 13 as well as various electrical cables to an eddy current probe and drive assembly contained within the housing 3. The flexible tubing 11 serves the additional function of conveying shield gas up through the hollow interior of the welder housing 3 in order to apply a flow of corrosion impeding, inert gas onto the region of the sleeve or tube being welded by the system 1. A welder delivery device 14 is used to insert and withdraw the welder housing 3 from the open end of a selected heat exchanger tube. In the preferred embodiment, this delivery device 14 may be the ROSA robotic arm developed and manufactured by the Westinghouse Electric Corporation located in Pittsburgh, Pa., and described and claimed in U.S. patent application Ser. No. 07/607,705 filed Nov. 1, 1990, and likewise assigned to the Westinghouse Electric Corporation. A pusher-puller assembly 15 is used to extend and retract the flexible tubing 11 as the welder housing 3 is inserted and withdrawn from a selected heat exchanger tube. The pusher-puller assembly may be constructed like the insertion and pusher drive mechanism illustrated in FIGS. 4A and 4B of U.S. patent application No. 06/802,556 filed Nov. 26, 1985, by R.G. Kelley, Jr. et al. and assigned to the Westinghouse Electric Corporation. Finally, the system 1 includes a source 17 of laser light connected to the fiber-optic cable 13, a drive assembly power source 18 and an eddy current circuit 19 connected to the drive assembly 8 and eddy current probe 10 via appropriate electrical cables contained within the flexible tubing 11, and a source 20 of shield gas which is coupled onto the end of the flexible tubing 11 by way of a gas coupling (not shown).

The welding system 1 of the invention is particularly useful in welding tubular sleeves 21 to the interior surfaces of the heat exchanger tubes 22 in a nuclear steam generator 23. Such generators 23 generally comprise tubesheet 24 that hydraulically isolates the lower, bowl-shaped primary side 26 of the generator 23 from the upper, cylindrically shaped secondary side 28 of the generator 23. The tubesheet 24 includes a plurality of bores through which the lower ends of the heat exchanger tubes 22 extend. The lower ends of each of the tubes 22 are open, and are secured to the bores of the tubesheet 24 by means of an annular weld (not shown). During the operation of the steam generator 23, hot, radioactive water enters the lower open ends of the heat exchanger tubes 22 and flows upwardly through the interiors of these tubes 22 in order to heat non-radioactive water which is introduced into the secondary side 28 of the generator 23. As is best seen with reference to FIG. 2, each of the heat exchanger tubes 22 are further laterally supported throughout the width of the secondary side 28 of the steam generator 23 by a series of support plates 30. Each of these support plates 30 includes a plurality of bores 32 through which the heat exchanger tubes 22 extend. As is evident in FIG. 2, an annular clearance exists between the bores 32 of the support plates 30, and the exterior surface of the heat exchanger tubes 22. Over long periods of time, sludge and other debris may accumulate in these annular spaces due to a combination of imperfect circulation of the ambient water through the space, and localized boiling. This sludge and other debris can promote the occurrence of stress corrosion cracking in the section of the heat exchanger tubes 22 surrounded by the bores 32 of the support plates 30. If the heat exchanger tubes 22 are allowed to crack in these regions before the installation of reinforcing sleeves 21, hot, radioactive water from the primary side 26 of the generator 23 can flow through the walls of the tubes 22 and contaminate the non-radioactive water that surrounds these tubes 22 in the secondary side 28 of the generator 23. The purpose of the welding system 1 of the invention is to secure such sleeves 21 in place against the interior surface of the heat exchanger tubes 22 as quickly and as reliably as possible. The welding system 1 is capable of performing such welding operations remotely through the manways 32 located in the primary side 26 of the generator 23.

Figure 4:
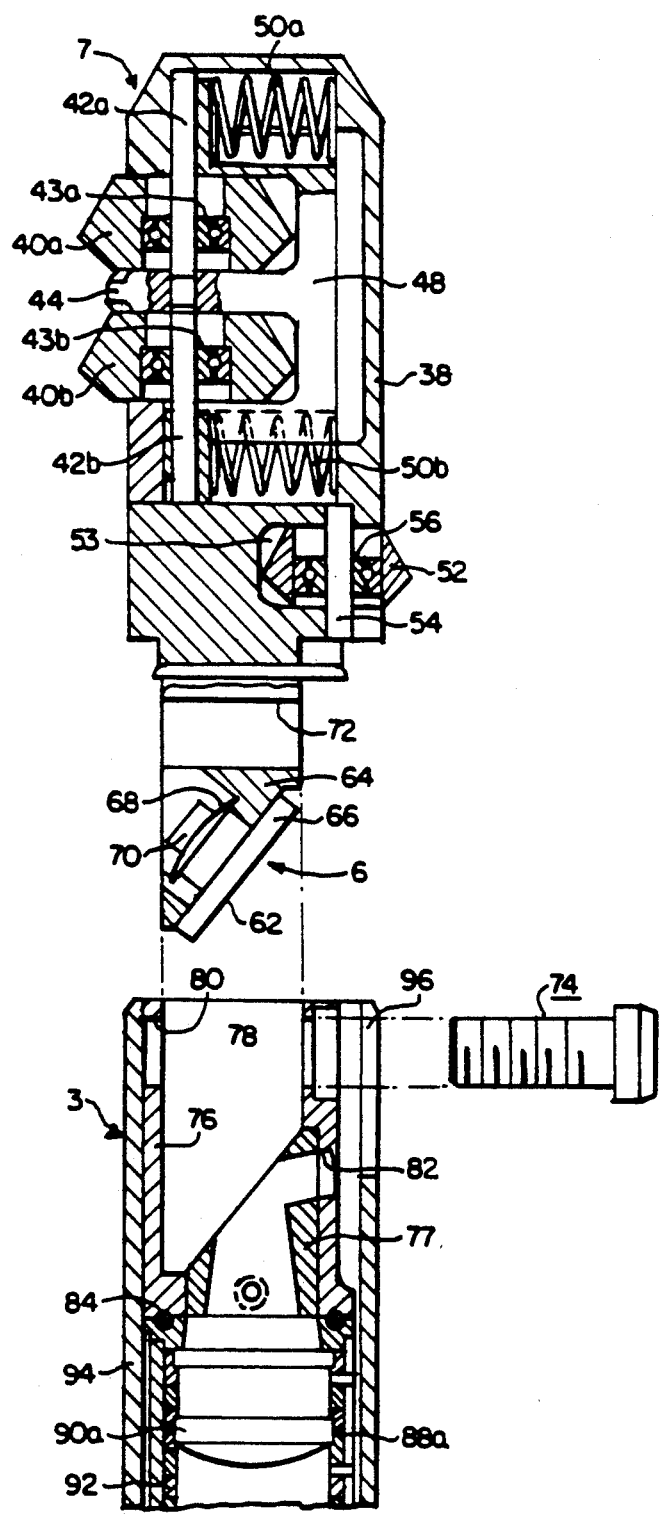
FIG. 4 is a cross-sectional side view of the distal portion of the housing illustrated in FIG. 3, illustrating how both the mirror of the beam deflection mechanism and the tracking assembly can be conveniently detached from the balance of the housing by the removal of a single screw.
Figure 3:
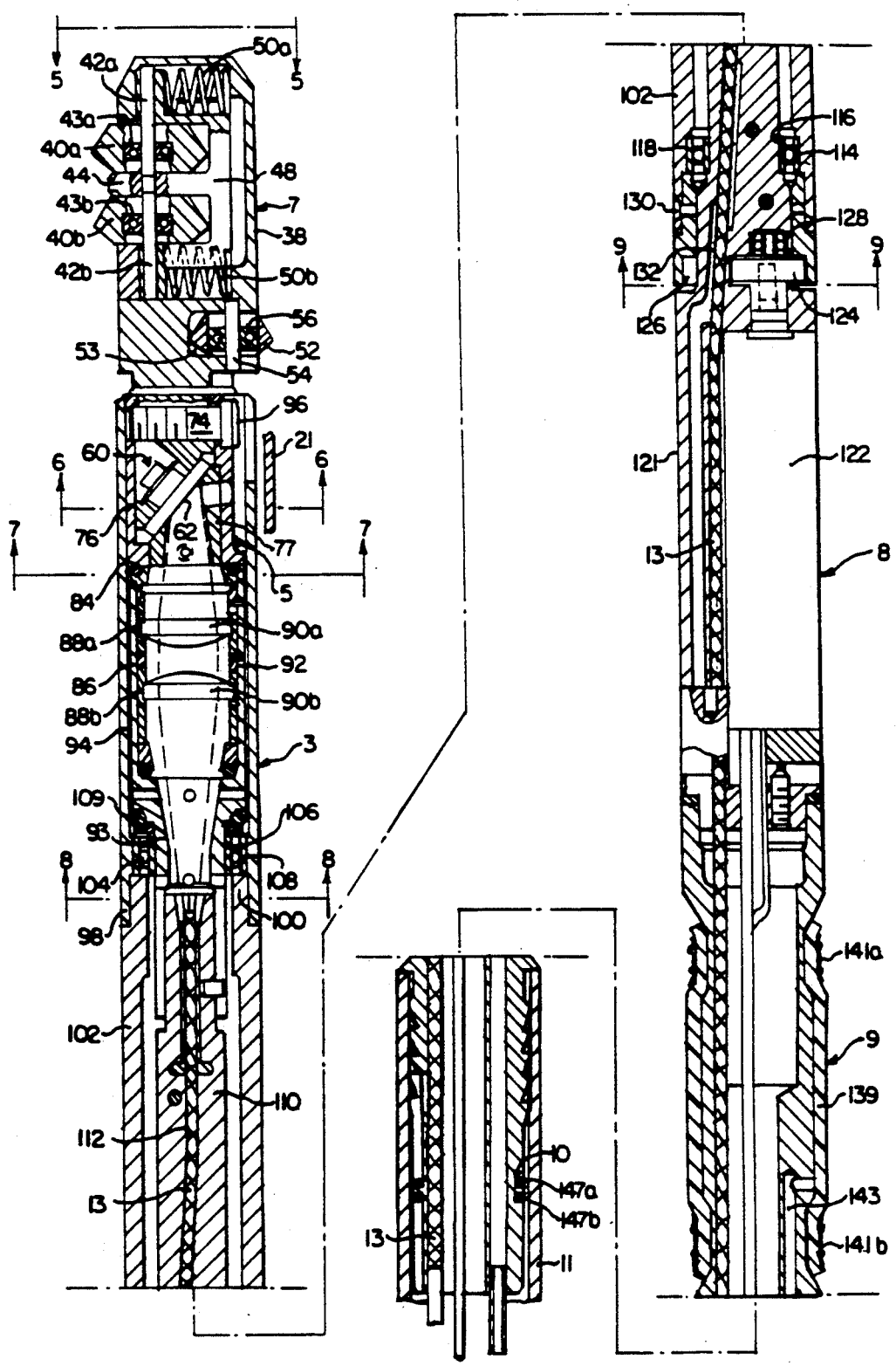
FIG. 3 is a cross-sectional side view of the elongated tubular welder housing of the welding system.
Figure 5:
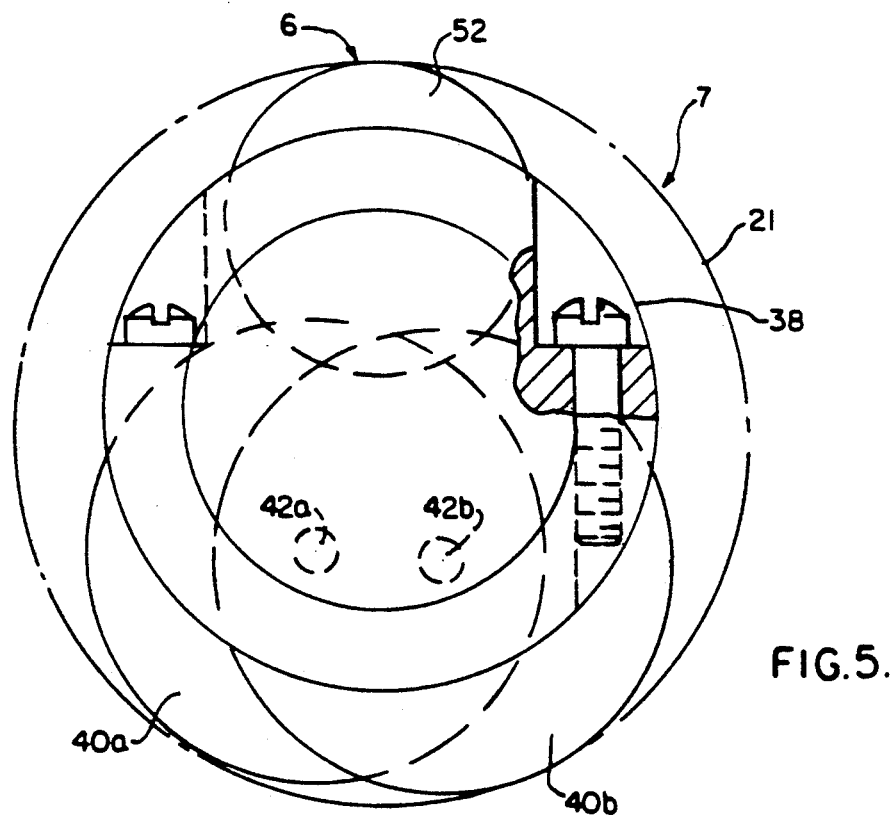
FIG. 5 is a top view of the distal end of the housing illustrated in FIG. 3 along the line 5—5, illustrating the three-point contact that the rollers of the tracking assembly provides for the housing.

With reference now to FIGS. 3 and 4, the tracking assembly 7 comprises a distal housing portion 38 which is generally cylindrical in shape. The distal housing portion 38 includes a pair of resiliently mounted rollers 40a,b at its rear portion, which is opposite from the front portion 6 of the beam deflection mechanism 5. As will be described in more detail hereinafter, the distal housing portion 38 is connected to the mirror of the beam deflection assembly 5 so that it rotates along with the mirror during a welding operation. As such rotation occurs, the rollers 40a,b remain directly behind the front portion 6 of the beam deflection mechanism 5, as may be most easily seen in FIG. 5. Each of the resiliently mounted rear rollers 40a,b is rotatably mounted on a shaft member 42a,b. These shafts are not colinear, but rather are offset from one another as again may best be appreciated in FIG. 5. The rollers 40a,b are mounted onto these shafts 42a,b through roller bearings 43a,b, respectively. The shaft members 42a,b are in turn mounted in a roller carriage 44 which is resiliently movable in a radial direction with respect to the longitudinal axis of the housing 3 by means of upper and lower springs 50a,b. The tracking assembly 7 further includes a fixedly mounted front roller 52 which is disposed between the front portion 6 of the beam deflection assembly 5, and the distal housing portion 38. This front roller 52 is disposed within a recess 53 in the distal housing portion 38, where it is mounted on a shaft 54 through a roller bearing 56. In operation, the two rear mounted rollers 40a,b and the front fixedly mounted roller 52 provide three point contact between the inner diameter of a sleeve 21, and the distal housing portion 38 as is best seen in FIG. 5. The resiliently mounted rear rollers 40a,b maintain a constant distance between the front portion 6 of the beam deflection mechanism 5 and the housing 3 by continuously biasing the fixedly mounted front roller 52 into engagement against the inner wall of the sleeve 21. This is important, as the maintenance of a constant distance between the housing 3 and the inner wall of the sleeve 21 maintains the laser beam emitted from the front portion 6 of the beam deflection mechanism 5 in sharp focus.

With further reference to FIGS. 3 and 4, the beam deflection mechanism 5 comprises a rotatable mirror assembly generally indicated at 60. The assembly 60 includes a first surface mirror 62 formed from polished copper which is detachably secured onto a mirror mounting body 64 by means of a mounting plate 66, a Belleville washer 68, and screw 70. The mirror mounting body 64 secures the mirror 62 at a 40 degree orientation with respect to the longitudinal axis of the housing 3 such that the mirror reflects laser light conducted along the longitudinal axis on the housing 3 via the fiber-optic cable 13 into a substantially radially-oriented direction with respect to the sleeve or tube being welded.

Figure 6:
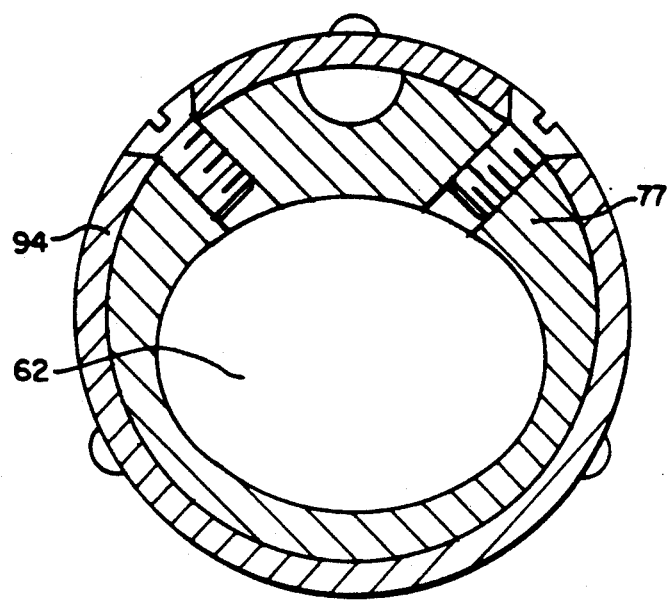
FIG. 6 is a cross-sectional view of the housing illustrated in FIG. 3 along the line 6—6, illustrating both the mirror used in the beam deflection mechanism and the sleeve liner that surrounds it.
Figure 7:
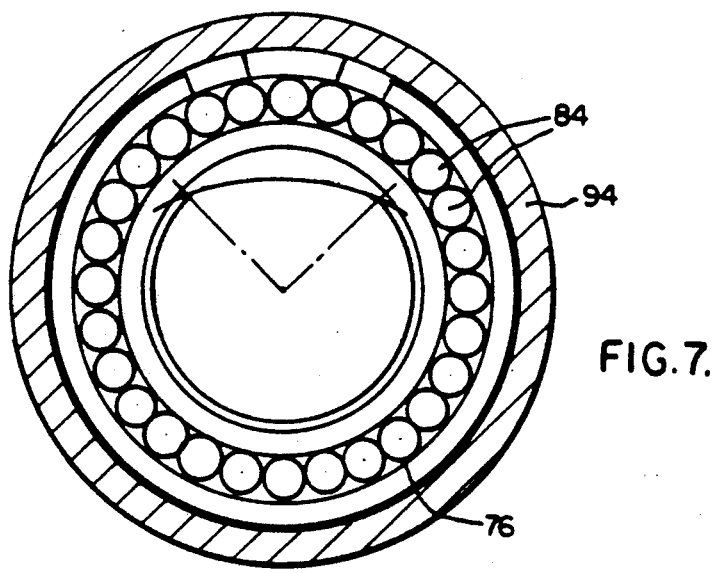
FIG. 7 is a cross-sectional view of the housing illustrated in FIG. 3 along the line 7—7, illustrating the roller bearing that separates the bottom edge of the inner mounting sleeve that surrounds the mirror and the top edge of the stationary lens barrel.

It is important to note that the mirror mounting body 64 is integrally attached to the distal housing portion 38 of the tracking assembly 7, and that the upper portion of the body 64 includes a bore 72 which receives a disassembly screw 74 when the housing 3 is assembled as shown in FIG. 3. An inner mounting sleeve 76 circumscribes the mirror mounting body 64 when the housing 3 is so assembled. At its lower end, the inner mounting sleeve includes a sleeve liner 77 which in effect frames the reflecting surface of the mirror 62 (see FIG. 6 in this regard). At its upper end, the inner mounting sleeve 76 includes a bore 78 having a threaded end 80 into which the threads of the disassembly screw 74 may be engaged. When one wishes to remove the mirror 62 of the beam deflection mechanism 5, all that is necessary is to remove the disassembly screw 74 as shown in FIG. 4. The removal of the screw 74 will allow the mirror mounting body 64, along with the mirror 62 itself to be readily pulled off from the housing 3 along with the tracking assembly 7. The ability of the mirror mounting body 64 to be so easily and completely removed from the housing 3 greatly facilitates replacement of the mirror 62.

Both the sleeve liner 77 and the inner mounting sleeve 76 include a beam aperture 82 for transmitting the radially-directed laser beam reflected by the mirror 62 when the system 1 is in operation. Additionally, a roller bearing 84 is disposed at the bottom edge of the inner mounting sleeve 76 and the upper edge of the lens barrel 86. As will be more evident shortly, the lens barrel 86 is stationary during the operation of the housing 3 of the system 1, while the inner mounting sleeve 76 and sleeve liner 77 rotate along with the mirror 62. Accordingly, the roller bearing 84 minimizes friction between the stationary lens barrel 86, and the rotating inner mounting sleeve 76 and sleeve liner 77.

The purpose of the lens barrel 86 is to secure the lenses of the beam deflection mechanism 5 in place along the longitudinal axis of the housing 3 so that they will focus the laser beam emitted by the fiber-optical cable 13 into a sharp point on the inner surface of a sleeve 21. To this end, the lens barrel 86 includes a pair of longitudinally spaced apart lens holders 88a,b for mounting focusing lenses 90a,b respectively. Ring-like lens spacers 92 are disposed between the lens holders 88a,b. The lens spacers 92 are removable so that the focus on the lenses 90a,b can be adjusted. At its bottom end, the lends barrel 86 includes a reduced diameter portion 93 as shown.

Figure 8:
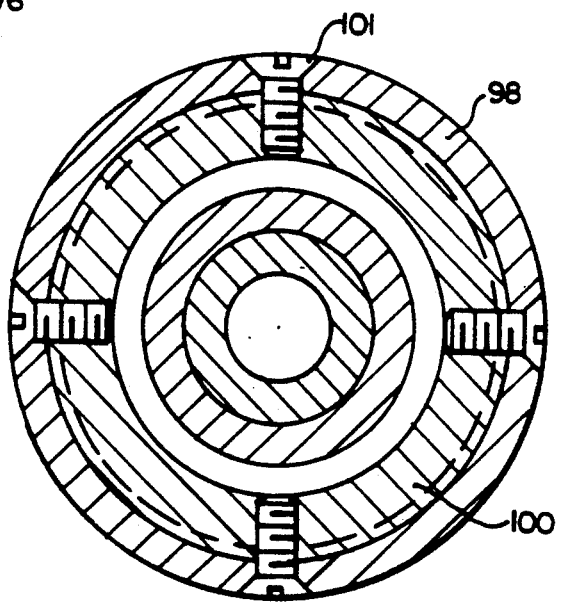
FIG. 8 is a cross-sectional side view of the housing illustrated in FIG. 3 along the line 8—8, illustrating how the ends of the outer distal support sleeve and the outer middle support sleeve interfit with one another.

As is best seen in FIG. 3, the sleeve liner 77 and inner mounting sleeve 76 are each concentrically disposed within an outer distal support sleeve 94. At its upper end, the sleeve 94 includes an opening 96 for admitting the disassembly screw 74. At its lower end, the sleeve 94 includes a flange 98 which slips over a smaller diameter flange 100 present on the upper end of an outer middle support sleeve 102. The inner fitting flanges 98,100 of the sleeves 94,102, are secured together by means of mounting screws 101 as is best seen in FIG. 8. Because both the outer distal and outer middle support sleeves 94,102 rotate relative to the stationary lens barrel 86 during the operation of the welding system 1, a bearing 104 is placed between the reduced diameter end 94 of the lens barrel 86, and the inner diameter of the sleeve 94. The inner race 106 of the bearing 104 is secured to the reduced diameter end 93 of the lens barrel 86, while the outer race 108 is secured to the inner diameter of the outer distal support sleeve 94 as shown. An 0-ring 109 disposed between the bearing 104 and a shoulder of the reduced diameter end 93 of the lens barrel 86 maintains the lens barrel 86 in a constant axial position with respect to the mirror 62.

Disposed immediately below the lens barrel 86 is a fiber-optic cable support 110. This support 110 includes a bore 112 which receives and guides fiber-optic cable 13. Because the fiber-optic cable support 110 is stationary with respect to the outer middle support sleeve 102, a bearing 114 having an inner race disposed around the cable support 110 and an outer race 118 disposed around the inner diameter of the sleeve 102 is provided to eliminate friction therebetween.

Figure 9:
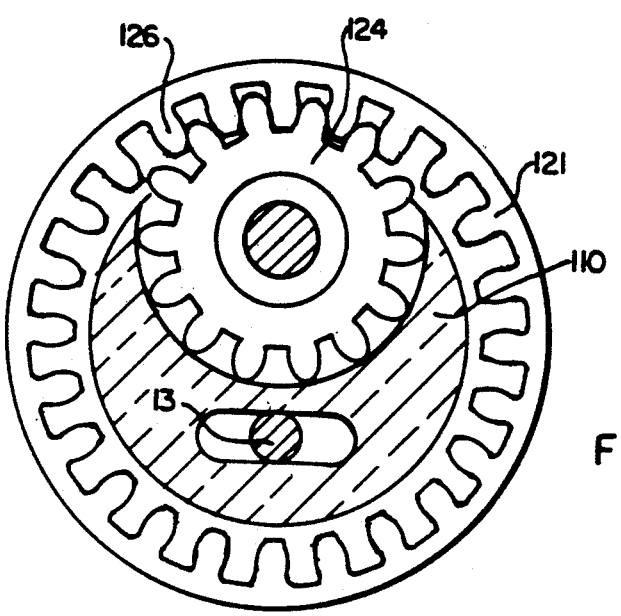
FIG. 9 is a cross-sectional view of the housing illustrated in FIG. 3 along the line 9—9, illustrating both the drive gear and the driven gear of the drive assembly which rotates the beam deflection mechanism of the welding system.

With reference now to FIGS. 3 and 9, the drive assembly 8 is contained within an outer proximal support sleeve 121 secured to the bottom edge of the outer middle support sleeve 102, and includes an electric motor 122, a drive gear 124, and a driven gear 126. The driven gear is in turn connected to a gear flange 128 which circumscribes the inner diameter of the proximal end of the outer middle support sleeve 102. Mounting screws 130 secure the gear flange 128 to the bottom edge of the support sleeve 102. In operation, the drive gear 124 engages and turns the driven gear 126 which in turn rotates the outer middle support sleeve 102 through the gear flange 128. The outer middle support sleeve 102 in turn rotates the outer distal support sleeve 94. This same rotary motion is in turn conducted to the inner mounting sleeve 76 and sleeve liner 77 through the disassembly screw 74. Hence, a welder housing 3 is provided wherein the mirror 62 of the beam deflection mechanism 5 is rotated via support sleeves 94 and 102, while the lens barrel 86 remains stationary, which advantageously helps to stabilize the optical path through the housing 3.

It is important to note that only a single S-curve 132 is imparted into the fiber-optic cable 13 throughout the housing 3. Whereas it would be possible to impose a further S-curve in this cable 13 behind the electric motor 122 of the drive assembly 8 in order to realign the fiber-optic cable 13 along the center line of the housing 3, the applicant has empirically determined that the imposition of a second S-curve in the fiber-optic cable 13 seriously impairs the ability of the cable 13 to efficiently transmit laser light to the beam deflection mechanism 5. Accordingly, the applicant has advantageously opted to maintain the fiber-optic cable 13 in a lateral position which allows it to traverse the length of the electric motor 122, and further allows it to be aligned along the center line of the housing 3 into a concentric arrangement with the lens barrel 86 by the use of only a single S-curve 132. The applicant has further determined that the radius of curvature of each of the bends of the S-curve 132 is critical to the efficient transmission of laser light throughout the cable 13, and that this radius of curvature should be approximately double the value of the critical curvature that the fiber-optic cable is rated at. Accordingly, if the critical curvature for a single bend is 150 inches, then the radius of curvature for each of the curves in the S bend should be about 250–300 inches.

With reference now to FIG. 3, the securing assembly 9 of the housing 3 is formed from a latex bladder 139 which circumscribes the proximal end of the housing 3. The ends of the latex bladder 139 are secured around the proximal end of the housing 3 by means of securing clamps 141. Additionally, a passage way 143 for pressurized fluid is provided within the housing 3 for selectively introducing pressurized fluid between the outer diameter of the housing 3, and the interior of the bladder 139. When such fluid is introduced, the bladder 139 expands against the inner surface of the heat exchanger tube 22 in which the housing 3 is inserted, and secures the entire housing 3 at a desired location along the longitudinal axis of the tube 22. In the preferred embodiment, the pressurized fluid introduced through the passageway 43 may be the same pressurized, inert gas used as a shield gas during the welding operation.

Finally, at the lowermost section of the housing 3, an eddy current probe 10 is provided which is formed from a pair of bobbin coils 147a,b. The purpose of these bobbin coils 147a,b is to detect the location of the bottom edge of the sleeve 21 being welded to the heat exchanger tube 22. The length of the housing 3 has been deliberately chosen so that the front portion 6 of the beam deflection mechanism 5 will be positioned at the proper point near the top edge of the sleeve 21 to commence a welding operation.

In operation, the elongated tubular welder housing 3 is introduced through the manway 32 by the pusher-puller assembly 15. Next, the housing 3 is grasped by the delivery device 14, which inserts it through the open end of a particular heat exchanger tube 22 into which a sleeve has been delivered, but not secured. The eddy current probe 10 is then used to place the mirror 62 of the beam deflection mechanism 5 adjacent to an upper or lower end of a reinforcing sleeve 21, as is shown in FIG. 2. This is done by orienting the coils 147a,b of the eddy current probe 10 next to the bottom edge of the sleeve 21, in the previously described fashion. Next, shield gas from pressurized gas source 20 is introduced through the flexible tubing 11, and the drive assembly 8 is started by conducting power to the electric motor 122 which in turn causes the mirror 62 to rotate. Laser light from laser source 17 is then conducted through the fiber-optic cable 13, and focused through the lenses in the lens barrel 86 onto the mirror 62, which in turn reflects a sharply focused point of laser light onto the inner diameter of the sleeve 21. The motor 122 proceeds to rotate the mirror 62 for a few degrees over one complete revolution, such that the thin circle of laser light sweeps around the inner diameter of the sleeve 21, thereby welding it to the inner diameter of the tube 22. All during the welding operation, shield gas maintains the latex bladder 139 of the securing assembly 9 in an expanded state, thereby holding the housing 3 in the desired position. This same shield gas surrounds the interface between the hot beam of laser light directed by the mirror 62, and the inner wall of sleeve 21 in order to keep the situs of the weld from corroding. The orientation of the mirror 62 also advantageously deflects shield gas flowing axially through the housing 3 into a radial orientation. Such a radial orientation helps to reduce metal splatter on the mirror, and minimizes unwanted distortion of the weld which could occur if the shield gas flowed over the weld in an axial direction. Additionally, all during the rotation of the mirror 62 within the beam deflection mechanism 5, the resilient rear wheels of the tracking assembly 7 function to maintain the distance between the front portion 6 of the beam deflection mechanism and the inner wall of the sleeve 21 constant during the entire welding operation. Upon the termination of this welding operation, both the drive assembly power circuit 18 and the laser source 17 are deactuated, and pressurized gas from the source 20 is no longer admitted into the bladder 139, thereby freeing the housing 3 within the tube 22. The delivery device 14 withdraws the housing 3 to align the front and repeats the operation to completely secure the sleeve 21 in the tube 22 at both ends, whereupon the housing 3 is withdrawn.

We claim:

1. A system for laser welding the inner wall of a conduit, comprising:
   1) an elongated tubular housing having a distal portion and proximal portion;
   2) a fiber-optic cable means for conducting remotely generated laser light into said tubular housing:
   3) a beam deflection mechanism supported within said housing and including a rotating reflecting means for radially directing and focusing light received from said fiber-optic cable means around the inner wall of a conduit, and
   4) a tracking assembly mounted on said tubular housing for maintaining a constant radial distance between the reflecting means of the deflection mechanism and the inner wall of said conduit despite irregularities in the roundness of said wall to maintain the focus of said beam against said conduit wall, wherein said reflecting means has a front portion that emanates said beam and wherein said tracking assembly includes a follower means for spacing the front portion of the reflecting means a constant radial distance from said conduit wall, and a means for radially biasing the follower means against the inner wall of the conduit as said reflecting means rotates.

2. A system as defined in claim 1, wherein said follower means of said tracking assembly includes a fixedly mounted roller means between said front portion of said reflecting means and said conduit wall so that the tracking assembly rollingly engages said conduit wall as said reflecting means rotates.

3. A system as defined in claim 2, wherein said tracking assembly includes at least first and second roller means disposed between said front portion and a back portion of said reflecting means, respectively, for maintaining two point contact between said assembly and said conduit wall, wherein said second roller means is resiliently mounted in said tubular housing for applying said radial biasing force against said reflecting means.

4. A system as defined in claim 3, wherein said tracking assembly includes a third roller means disposed between said back portion of said reflecting means and said conduit wall for maintaining three point contact between said assembly and said conduit wall.

5. A system as defined in claim 1, wherein said fiber-optic cable means includes a distal portion having an end aligned with the center line of said housing that optically couples to said beam deflection assembly, and said proximal portion of said housing includes a component that displaces the distal portion of the cable means from said center line, and said distal portion of the cable means traverses said component by way of a single S bend only.

6. A system as defined in claim 1, wherein said fiber-optic cable includes a distal portion that is located within said tubular housing, and that traverses obstructing components located in said housing by no more than one S bend.

7. A system as defined in claim 6, wherein the radii of curvature used in the single S bend is at least double the value of the critical curvature of the fiber-optic cable means.

8. A system as defined in claim 1, wherein the distal portion of said housing is rotatable relative to the proximal portion thereof, and wherein at least part of said distal portion is detachably removable to provide access to said reflecting means.

9. A system as defined in claim 8, wherein said reflecting means is detachably mounted onto said removable part of said distal portion of said housing.

10. A system for laser welding the inner wall of a tube, comprising
    1) an elongated tubular housing having a distal portion and a proximal portion;
    2) a fiber-optic cable means disposed in said proximal portions of said housing for conducting remotely generated laser light into said tubular housing;
    3) a beam deflection mechanism supported within reflecting means having a front portion for radially directing and focusing light received from said fiber-optic cable means around the inner wall of said tube; and
    4) a tracking assembly mounted on said tubular housing for maintaining a constant radial distance between the reflecting means and the inner wall of said tube despite irregularities in the roundness of said wall to maintain the focus of said beam against the wall, including a follower means for spacing the front portion of the reflecting means a constant radial distance from said tube wall, and a biasing means for radially biasing the follower means against the inner wall of the tube as said reflecting means rotates.

11. A system as defined in claim 10, wherein said tracking assembly includes at least first and second roller means disposed between said front portion and a back portion of said reflecting means, respectively, for maintaining two point contact between said assembly and said tube wall, wherein said first roller means fixedly mounted and forms said follower means, and said second roller means is resiliently mounted in said tubular housing for applying said radial biasing force against said first roller means.

12. A system as defined in claim 10, wherein said fiber-optic cable means includes a distal portion having an end aligned with the center line of said housing that optically couples to said beam deflection assembly, and said proximal portion of said housing includes a component that displaces the distal portion of the cable means from said center line, and said distal portion of the cable means traverses said component by way of a single S bend only.

13. A system as defined in claim 10, wherein the radii of curvature used in the single S bend is at least double the value of the critical curvature of the fiber-optic cable means.

14. A system as defined in claim 10, wherein the distal portion of said housing is rotatable relative to the proximal portion thereof, and said reflecting means of said beam deflection mechanism is rotatably and detachably connected to a mounting means disposal within said distal housing portion, and wherein the part of said distal portion that contains said reflecting means is detachably connected to the balance of said distal housing portion to facilitate the replacement of said reflecting means.

15. A system as defined in claim 10, wherein said beam deflection mechanism includes at least one lens for focusing the laser light from said fiber-optic cable means, and a sleeve for supporting said lens which is mounted onto the proximal portion of the tubular housing such that said lens does not rotate along with the reflecting means.

16. A system as defined in claim 15, further including means for adjusting the position of said lens within said support sleeve.

17. A system for laser welding the inner wall of a tube, comprising
 1) an elongated tubular housing having a distal portion and a proximal portion;
 2) a fiber-optic cable means disposed in said proximal portions of said housing for conducting remotely generated laser light into said tubular housing;
 3) a beam deflection mechanism supported within said housing and including a rotating reflecting means having a front portion for radially directing and focusing light received from said fiber-optic cable means around the inner wall of said tube; and
 4) wherein said fiber-optic cable means includes a distal portion having an end aligned with the center line of said housing that optically couples to said beam deflection assembly, and said proximal portion of said housing includes a component that displaces the distal portion of the cable means from said center line, and said distal portion of the cable means traverses said component by way of a single S bend only.

18. A system as defined in claim 17, wherein the radii of curvature used in the single S bend is at least double the value of the critical curvature of the fiber-optic cable means.

19. A system as defined in claim 17, wherein the distal portion of said housing is rotatable relative to the proximal portion thereof, and said reflecting means of said beam deflection mechanism is rotatably and detachably connected to said distal housing portion, and wherein the part of said distal portion that contains said reflecting means is detachably connected to the balance of said distal housing portion to facilitate the replacement of said reflecting means.

20. A system as defined in claim 17, wherein said beam deflection mechanism includes at least one lens for focusing the laser light from said fiber-optic cable means, and a sleeve for supporting said lens which is mounted onto the proximal portion of the tubular housing such that said lens does not rotate along with the reflecting means.

21. A system as defined in claim 20, further including means for adjusting the position of said lens within said, support sleeve.

22. A system for laser welding the inner wall of a tube, comprising
 1) an elongated tubular housing having a distal portion and a proximal portion;
 2) a fiber-optic cable means disposed in said proximal portion of said housing for conducting remotely generated laser light into said tubular housing;
 3) a beam deflection mechanism supported within said housing and including a rotating reflecting means having a front portion for radially directly and focusing light received from said fiber-optic means around the inner wall of said tube, and a mounting means for detachably mounting said reflecting means to said beam deflection mechanism; and
 4) wherein said reflecting means of said beam deflection mechanism is disposed within section of said distal portion of said housing that is rotatably and detachably connected to the balance of said housing to facilitate the replacement of said reflecting means.

23. A system for laser welding the inner wall of a tube, comprising
 1) an elongated tubular housing having a distal portion and a proximal portion;
 2) a fiber-optic cable means disposed in said proximal portion of said housing for conducting remotely generated laser light into said tubular housing;
 3) a beam deflection mechanism supported within said housing and including a rotating reflecting means having a front portion for radially directing and focusing light received from said fiber-optic cable means around the inner wall of said tube;
 4) wherein said fiber-optic cable means includes a distal portion having an end aligned with the center line of said housing that optically couples to said beam deflection assembly, and said proximal portion of said housing includes a component that displaces the distal portion of the cable means from said center line, and said distal portion of the cable means traverses said component by way of a single S bend only; and
 5) wherein the distal portion of said housing is rotatable relative tot he proximal portion thereof, and said reflecting means of said beam deflection mechanism is contained within said distal housing portion, and wherein the part of said distal portion that contains said reflecting means is detachably connected to the balance of said distal housing portion to facilitate the replacement of said reflecting means.

24. A system as defined in claim 23, wherein said /beam deflection mechanism includes at least one lens for focusing the laser light from said fiber-optic cable means, and a sleeve for supporting said lens which is mounted onto the proximal portion of the tubular housing such that said lens does not rotate along with the reflecting means.

25. A method of laser welding the inner wall of a conduit by means of an elongated housing, a fiber-optic cable means that conducts remotely generated laser light into the housing, a beam deflection mechanism rotatably supported within the housing having a front portion for radially directing and focusing laser light around the inner wall of the conduit, comprising the step of simultaneously biasing the front portion of the beam deflection mechanism while rotating the mechanism to maintain a constant distance between the front portion of said mechanism and said inner wall while said mechanism radially directs a beam of laser light around said inner wall.

* * * * *